Jan. 12, 1971  R. E. FROST  3,553,765

REPLACEABLE CARRIAGE WHEEL ASSEMBLY

Filed Oct. 30, 1968  2 Sheets-Sheet 1

INVENTOR.
RUBEN E. FROST
BY
ATTORNEYS

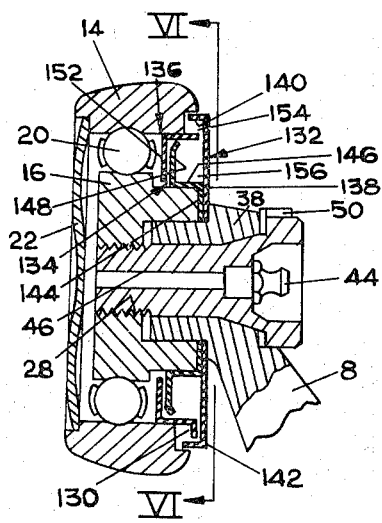
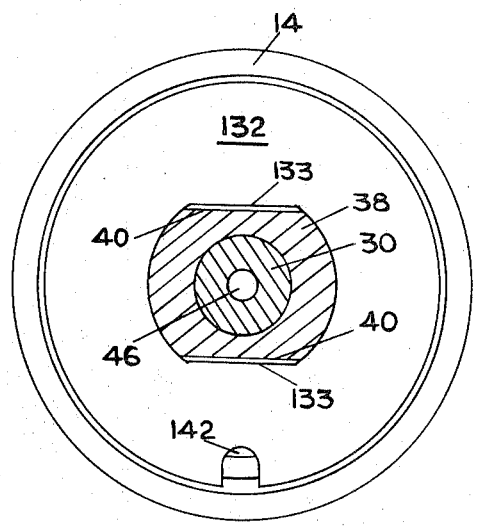
FIG. 5    FIG. 6
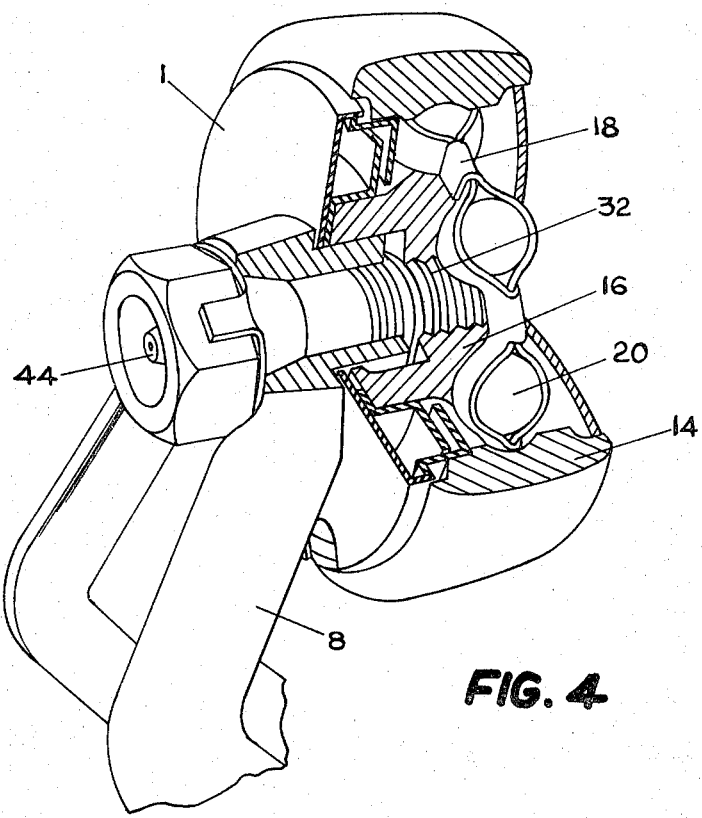
FIG. 4

United States Patent Office 3,553,765
Patented Jan. 12, 1971

3,553,765
REPLACEABLE CARRIAGE WHEEL ASSEMBLY
Ruben E. Frost, Grand Rapids, Mich., assignor to C. L. Frost & Son, Inc., Grand Rapids, Mich., a corporation of Michigan
Filed Oct. 30, 1968, Ser. No. 771,866
Int. Cl. B61b 3/00
U.S. Cl. 16—107        15 Claims

ABSTRACT OF THE DISCLOSURE

This disclosure relates to a replaceable carriage wheel for use, for example, in an overhead trolley conveyor system. The wheel has an outer race member, an inner race member and bearing means between the outer and inner race members. An arm bracket depends from the assembly and is secured thereto by a stud member. The stud member removably engages the inner race member. The arm and the inner race have co-operating locking surfaces such that the two members are in a fixed relative position when in contact with each other. Preferably a lubricating passage is provided axially of the stud member and a recessed grease fitting is provided on the end of the stud. Means are provided to lock the stud against the arm when the stud is secured to the inner race member.

DISCLOSURE

This invention relates to replaceable carriage wheels. One of its aspects relates to a replaceable carriage wheel for overhead trolley systems in which an inner race member on the wheel and a depending arm have interengaging locking surfaces such that the two parts are locked together relative to each other when fastened together.

In another of its aspects, the invention relates to a carriage wheel assembly having outer and inner race members with bearings therebetween, a depending arm is fastened to the inner race member through a stud having a lubricating passage therethrough for lubricating the bearings, wherein the stud has a recessed grease fitting at the outer end thereof.

Carriage conveyor systems are used extensively in manufacturing plants and other industrial concerns. For example, a type of such carriage system is an overhead trolley system having I beam tracks with two wheels or more fitting at either side of the beam at the bottom flanges. The wheels are usually tied together by bracket arms which depend from the wheel and join beneath the track. The wheels frequently become worn and damaged from use. Generally, the entire load and/or the whole double wheel and bracket assembly must be removed in order to replace the wheels. Usually, the entire bracket assembly including the wheels must be replaced when a single wheel is defective.

Zebley 2,780,178, discloses an overhead trolley conveyor system wherein the wheels of the trolley are releaseably connected through a threaded stud member. In this manner, the wheels are replaceable without dismantling the entire bracket assembly. The construction disclosed in Zebley has a locking washer between the arm bracket and the inner race member for restricting the relative movement between those two members. However, this system has not been satisfactory for many operations.

I have discovered an improved replaceable carriage wheel construction suitable for heavy duty operations wherein the arm and the inner race members have inter-engaging locking surfaces to maintain the two members in a fixed relative position when fastened together.

The construction of Zebley also employs a lubricating passage in the central portion of the stud member. This is a conventional construction with the grease fitting on the end of the stud member. In many heavy duty operations, the grease fitting is inadvertently damaged during use of the trolley. When it comes time for a lubrication, the wheels having the damaged grease fittings are not lubricated with the result that the bearings in these wheels become prematurely worn out.

I have discovered an improved construction for avoiding the problem of damaged grease fittings in a wheel construction wherein the grease fittings are recessed into the head of the stud.

By various aspects of this invention one or more of the following, or other, objects can be obtained.

It is an object of this invention to provide a heavy duty carriage construction with easily replaceable wheels.

It is a further object of this invention to provide a relubricative carriage construction wherein the lubricating grease fitting is protected against inadvertent damage.

It is yet another object of this invention to provide a carriage construction having an easily removable wheel and a heavy duty interlock between a depending arm and an inner race member.

Another object of this invention is to provide a carriage construction with a seal having a drain hole which is maintained in a position so as to maximize drainage from the seal.

Other aspects, objects, and the several advantages of this invention are apparent to one skilled in the art from a study of this disclosure, the drawings, and the appended claims.

According to the invention there is provided a wheel assembly for a carriage conveyor system. The wheel assembly has an outer race member which rides on a track, an inner race member within the outer race member and bearing means between the outer and inner race members. An arm member is fixed to the inner race member by a stud which is removably secured to the inner race member. The inner race member is threaded and serves as a nut. The arm and the inner race member have co-operating locking surfaces such that the two members are in a fixed relative position when in contact with each other. This produces a means whereby the race member which is the nut, is held stationary by holding the arm.

According to one embodiment of the invention, the stud has a lubricating passage therethrough for providing lubrication to the bearing means between the outer and inner race members. The lubricating nipple or grease fitting is recessed in the outer end of the stud to prevent the grease fitting from being inadvertently damaged.

The invention will now be described with reference to the accompanying drawings in which:

FIG. 4 is a perspective view, partly in section, of a modified form of the invention;

FIG. 5 is a sectional view of the structure shown in FIG. 4; and

FIG. 6 is a sectional view of the structure of FIGS. 4 and 5 taken along lines VI—VI of FIG. 5.

Figure 2:
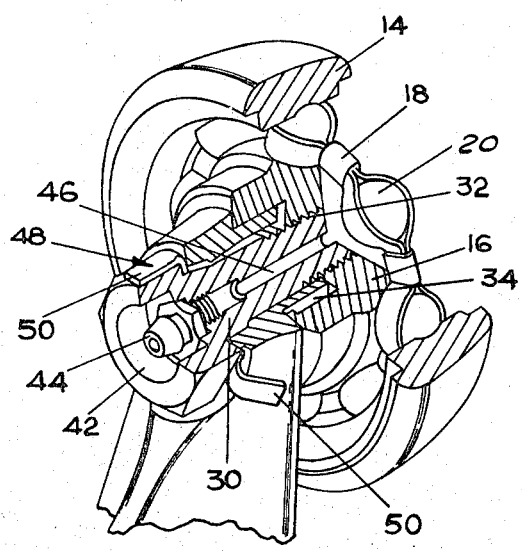
FIG. 2 is a perspective view, partly in section, of the wheel assembly shown in FIG. 1.
Figure 1:
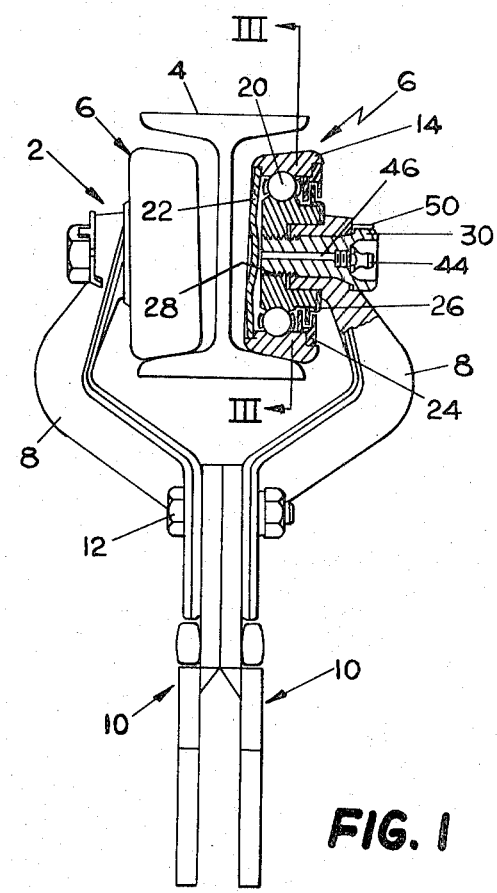
FIG. 1 is an elevational view, partly in section, illustrating an embodiment of the invention.
Figure 3:
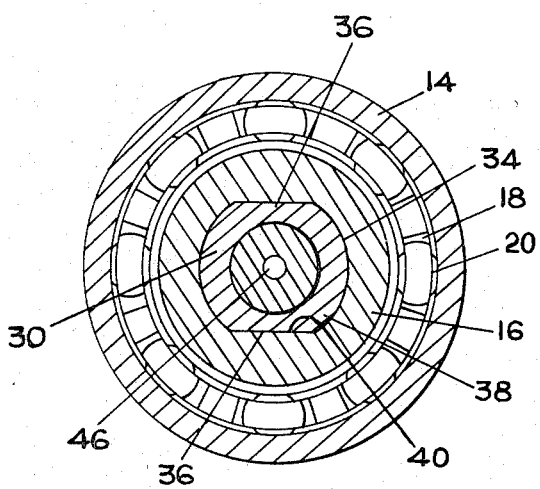
FIG. 3 is a side sectional view taken along lines III—III of FIG. 1.

According to the invention, a carriage assembly 2 rides on an I beam rail 4. The assembly, which is an overhead trolley in the preferred form, comprises a wheel assembly 6 having depending arms 8 affixed thereto at the upper end and extending outwardly and then inwardly below the I beam track. Hook supporting members 10 are fixed at the lower portion of the arms 8 through a bolt assembly 12.

The wheel assembly 6 comprises an outer race member 14, an inner race member 16, and a bearing assembly therebetween. The bearing assembly comprises a plurality of ball bearings 20 retained in a bearing holder 18. A sealing disc 22 is fixed in an inner circumference of the outer race member 14. A sealing member 24, having a pair of inwardly directed bifurcated flanges, is attached to an inner diametrical surface of the outer race member 14. A sealing disc 26, having an outwardly directed annular flange, positioned between the bifurcated flanges of sealing member 24, is fixed to the inner race member 16. In this manner, a labyrinth seal is provided between the bearing assembly and the outside of the wheel. Other well known sealing means can be employed without departing from the scope of the invention.

A stud member 30 having a threaded end 32 engages a threaded section 28 of the inner race member 16. The inner race member 16 has an annular opening 34 for receiving an inwardly extending annular portion 38 of arm member 8. The upper portion of arm 8 has a horizontal hole for receiving the body of stud member 30. The hole in the arm member 8 is smaller than the head of stud member 30. Therefore, when the stud member is positioned within the hole in the arm member 8 and is fastened to the inner race member 16, the stud member will hold the arm 8 within the inner race member 16.

According to one embodiment of the invention, the annular opening 34 in the inner race member 16 has flat portions 36. On the outer circumference of the inwardly extending portion 38 of arm 8 there are provided flat surfaces 40 which co-operate with the flat portions 36 to provide an interlocking engagement between the upper portion of arm 8 and the inner race member 16. In this manner, when the upper portion of arm 8 is positioned within the inner race member 16 as shown in the drawings, the two members will be interlocked so as to prevent relative rotation between the two. This interlocking relationship is necessary in order to install the stud member and to maintain the inner race member in a fixed position during operation.

Between the head of stud member 30 and arm 8 there is positioned a locking washer 48 having locking flanges 50. After the stud member has been tightened into inner race member 16, one of the locking flanges 50 is bent over a flat outer surface of the head of stud member 30 and the other locking flanges 50 are bent back to enage the arm 8. In this manner, the stud 30 is locked relative to arm 8.

A lubricating passage 46 is provided in a central portion of stud member 30 for passing lubricant from a grease fitting 44 to the bearing assembly between the inner race member 16 and the outer race member 14. According to another embodiment of the invention, the grease fitting 44 is positioned within a recessed portion 42 of the head of stud member 30. By this protective device, the grease fitting 44 is prevented from inadvertent damage during the use of the conveyor system.

OPERATION

When the wheels become worn, they are easily replaced by bending back the locked flanges 50 and unscrewing the threaded stud member 30. The inwardly extending annular portion 38 of arm 8 can then be withdrawn from the interior of the inner race member by moving the wheel assembly 6 inwardly on the track 4. Enough tolerance between the track and wheel is provided to remove the wheel assembly from engagement with the arm.

The new wheel is then added by sliding the wheel assembly 6 along the track 4 until it is adjacent arm 8. This inner race 16 is then inserted on the inwardly extending annular arm portion 38 and rotated until it locks with flat portion 36 of the inner race 16 in contact with the flat surface 40 of the inwardly extending annular arm portion 38. The stud member 30 is then screwed into the inner race and the locking flanges 50 are bent into place as shown in FIG. 2.

Reference is now made to FIGS. 4 through 6 for a description of the modified form of the invention.

The outer end of the bearing is sealed by a seal comprising an outer sealing ring 132, an intermediate sealing ring 134, and an inner sealing ring 136. This seal structure per se forms no part of the invention of this application as it is the subject of another application.

The outer sealing ring 132 has a radial annular flange 138 by which it is fixed to the inner race 16. An axial annular flange 140 extends axially inwardly from the outer radial end of the annular flange 138. A drain hole 142 is provided in the bottom to drain water which collects within the sealing structure.

The intermediate sealing ring 134 has a radial attaching flange 144 by which the sealing ring is fixed to the inner race 16. An axial cylindrical portion 146 extends inwardly from the radial attaching flange 144 and joins a radially outwardly extending portion 148 with an axially outwardly turned lip on the end thereof.

The inner sealing ring 136 has an axial ring portion 150 by which the sealing ring 136 is fixed to the outer race 14. A radially inwardly extending portion 152 depends from the inner portion of the axial ring portion 150 and is spaced axially inwardly of the radially outwardly extending portion 148 of the intermediate sealing ring 134. An annular recess 130 in the outer race 14 forms a trough 154 with the axial ring portion 50 and radially outwardly extending lip 53 for the collection of water which passes around the edge of the outer sealing ring 132. Water which collects in trough 154 can be discharged from the seal area through drain hole 142 as the outer race 14 rotates about the inner race 12.

The combination of the radial annular flange 148, the axial cylindrical portion 146 of intermediate sealing ring 134, and the radial annular flange 138 of the outer sealing ring form a second trough 156 within the seal area. This second trough 156 collects water and dirt which passes over the radially outwardly extending lip of the inner sealing ring 136. Accumulation of water and dirt will tend to flow around to the bottom of the trough and out drain hole 142. The axially outwardly extending lip on the radially outwardly extending portion 148 tends to force the water toward the drain hole as it runs downwardly within the trough 156.

The outer sealing ring 132 is maintained fixed relative to bracket arm 8 by means of the flat surfaces 40 on the inwardly extending portion 38 of arm 8. The inner diameter of the sealing ring 132 conforms to the outer diameter of the inwardly extending portion 38, the inner diameter of the sealing ring having flat portions 133 which bear against flat surfaces 40 to maintain the outer sealing ring 132 fixed relative to the arm. In the embodiment shown in FIGS. 4 through 6, the drain hole 142 would be maintained at the bottom of the sealing ring 132 so that water and dirt could always be drained from the inner sealing areas. If the structure shown in FIGS. 4 through 6 were to be inverted and used as carriage wheels, for example, then the sealing ring 132, when assembled, would be rotated 180° relative to the arm 8 so that the drain hole 142 would be in the lowermost area of the sealing ring 132. In this manner, it would be assured that water and dirt will drain from the seal area.

In the embodiments shown in the drawings, a simple construction has been provided wherein trolley wheels are replaceable and yet adapted for heavy duty operation. The trolley wheels can be replaced while the arms are attached to the chains and even while a load is being supported by the chain. Further, the lubricating grease fittings are protected from inadvertent damage.

The structure described provides for an assembly which is more easily maintained. The locking of the arm 8 to the inner race makes it possible to remove and replace the stud 30 without the use of a wrench. The arm 8 holds the inner race 16 as the stud 30 is threaded into or out of the inner race 16.

Reasonable variation and modification are possible within the scope of the foregoing disclosure, the drawings, and the appended claims without departing from the spirit of the invention.

The embodiments of the invention in which an exclusive property or privilege is claimed are defined as follows.

1. In a wheel assembly for a carriage conveyor system comprising an outer race member; an inner race member; bearing means between said outer and inner race members; an arm member; a stud member securing said arm to said inner race, said stud removably engaging said inner race member; the improvement which comprises:

a portion of said inner race having an annular opening of larger diameter than said stud, said arm having an annular upper portion positioned within said opening radially between said stud member and said inner race member; an interengaging locking means between said inner race member and said arm to hold said inner race member and said arm member in a fixed relative position when said arm portion is positioned within said annular opening of said inner race member.

2. A wheel assembly according to claim 1 wherein means are provided to lock said arm member in a fixed position relative to said stud member.

3. A wheel assembly according to claim 1 further comprising: a sealing means between said outer and inner race members; said sealing means forming an inner trough for the collection of water within said sealing means; there being a drain hole formed at an outer edge of said sealing means for draining said water collected in said trough from said sealing means; and means locking at least a portion of said sealing means to said arm member to maintain said drain hole in a bottom portion of said sealing means thereby maximizing the draining of water from said sealing means.

4. In a wheel assembly for a carriage conveyor system comprising an outer race member; an inner race member; bearing means between said outer and inner race member; a support member; a stud member securing said support member to said inner race; said stud removably engaging said inner race member; the improvement which comprises:

cooperating locking surfaces on said support member and on said inner race member such that said two members are in a fixed relative position when in contact with each other in said assembly.

5. A wheel assembly according to claim 4 wherein said cooperating locking surfaces comprise an annular opening having a flattened portion on said inner race, an inwardly projecting annular portion on said support member insertable into said annular opening and having an outer radial surface configuration conforming to the annular opening within said inner race member.

6. The wheel assembly of claim 5 in which a sealing means is provided between said outer and inner race members; said sealing means forming an inner trough for the collection of water within said sealing means; there being a drain hole formed at an outer edge of said sealing means for draining said water collected in said trough from said sealing means; said sealing means being mounted on said inwardly projecting annular portion by means of an opening receiving said portion; said opening having an outer radial surface configuration conforming to the annular opening within said inner race member.

7. A wheel assembly according to claim 4 wherein said stud has a lubricating passage extending therethrough and a recessed grease fitting is provided in the outer end of the said stud whereby said grease fitting is protected against inadvertent damage.

8. A wheel assembly according to claim 4 wherein said support member is an arm member bent outwardly and then inwardly below said wheel.

9. A wheel assembly according to claim 4 wherein means are provided for locking said stud member in a fixed position relative to said support member.

10. A wheel assembly according to claim 5 wherein said locking means comprises an annular washer positioned between the head of said stud member and said arm member, said washer having at least one flange bent over and contacting a flat surface of said head portion and at least one flange bent over and engaging a surface of said arm member.

11. In an overhead trolley conveyor system having a track; wheels rolling on either side of said track; arms depending down from each of said wheels and being connected together beneath said track; each of said wheels being constructed according to the assembly of claim 4.

12. The wheel assembly according to claim 4 further comprising: a sealing means between said outer and inner race members; said sealing means forming an inner trough for the collections of water within said sealing means; there being a drain hole formed at an outer edge of said sealing means for draining said water collected in said trough from said sealing means, and means locking at least a portion of said sealing means to said support member to maintain said drain hole in a bottom portion of said sealing means thereby maximizing the draining of water from said sealing means.

13. In a wheel assembly for a carriage conveyor system comprising an outer race member; an inner race member; bearing means between said outer and inner race members; an arm member; a stud member threadably securing said arm to said inner race, the improvement comprising:

said stud having a lubricating passage extending therethrough and a grease fitting recessed in the head of said stud member whereby said grease fitting is protected against inadvertent damage.

14. A wheel assembly for a carriage conveyor comprising an outer race member; an inner race member; an arm member in fixed relationship to said inner race member; bearing means between said inner and outer race members; sealing means between said inner and outer race members, said sealing means including a drain hole adjacent said outer race member for permitting the drainage of water from the interior of said sealing means; and interlocking means between said arm and said sealing means for maintaining said drain hole at a bottom portion of said sealing means to maximize the drainage of water therefrom.

15. In a wheel assembly for a carriage conveyor system comprising an outer race member; an inner race member; bearing means between said outer and inner race members; a support member; a stud member securing said support member to said inner race, said stud removably engaging said inner race member; the improvement which comprises:

a portion of said inner race having an annular opening of sufficient diameter to receive said stud, said inner race having means integral therewith located radially outwardly of said stud, said support member having a portion mating with said means and in conjunction therewith providing an interengaging locking means between said inner race member and said support member to hold said inner race member and said support member in a fixed relative position.

References Cited

UNITED STATES PATENTS

| 807,141 | 12/1905 | Tatum | 16—107X |
| 1,571,334 | 2/1926 | Howard | 16—98 |
| 2,250,167 | 7/1941 | Niles et al. | 105—154 |
| 2,517,652 | 8/1950 | Gaboury | 105—154UX |
| 2,566,322 | 9/1951 | Flowers | 308—187.1 |

DONALD A. GRIFFIN, Primary Examiner

U.S. Cl. X.R.

105—154